United States Patent
DeRosa

(10) Patent No.: US 6,332,619 B1
(45) Date of Patent: Dec. 25, 2001

(54) DEROSA ROUTER CHUCK

(75) Inventor: John L. DeRosa, Upper Marlboro, MD (US)

(73) Assignee: J. P. Walsh/J. P. Marmo Enterprises Inc., Springfield, VA (US)

(*) Notice: Subject to any disclaimer, the term of this patent is extended or adjusted under 35 U.S.C. 154(b) by 0 days.

(21) Appl. No.: 09/437,243

(22) Filed: Nov. 10, 1999

Related U.S. Application Data

(60) Provisional application No. 60/107,966, filed on Nov. 12, 1998.

(51) Int. Cl.$^7$ .................................................. B23B 31/107
(52) U.S. Cl. .............................. 279/76; 279/91; 279/103; 403/342; 403/374.3
(58) Field of Search .................................. 279/44, 45, 76, 279/83, 90, 91, 103; 403/342, 379.5, 374.3; 409/234

(56) References Cited

U.S. PATENT DOCUMENTS

| | | | |
|---|---|---|---|
| 1,440,207 | * 12/1922 | Burns | 403/342 |
| 3,091,474 | * 5/1963 | Boutros et al. | 279/97 |
| 5,096,212 | 3/1992 | Walsh . | |
| 5,348,319 | 9/1994 | Stolzer . | |

* cited by examiner

*Primary Examiner*—Steven C. Bishop
(74) *Attorney, Agent, or Firm*—Stevens, Davis, Miller & Mosher, L.L.P.

(57) ABSTRACT

A chuck for use with power tools to interchangeably accept and hold tools, such as wood or other cutting tools, especially router bits, of simple, lightweight design, improving manufacturing and assembly techniques, providing significant tool holding torque are disclosed. A method for connecting chucks, shafts and similarly threaded surfaces is also disclosed.

19 Claims, 2 Drawing Sheets

US 6,332,619 B1

DEROSA ROUTER CHUCK

CROSS-REFERENCE TO RELATED APPLICATIONS

This application claims the benefit of U.S. Provisional Serial No. 60/107,966, filed Nov. 12, 1998.

BACKGROUND OF THE INVENTION

1. Field of the Invention

Chucks for use with power tools to interchangeably accept and hold tools, such as wood or other cutting tools, especially router bits, of simple, lightweight design, improving manufacturing and assembly techniques, but providing significant tool holding torque, are disclosed.

2. Discussion of the Related Art

Power tools to drive cutting, boring, and other tool elements are well known.

U.S. Pat. No. 5,096,212 to Joseph P. Walsh (the entire disclosure of which is herein incorporated by reference in its entirety) provided a significant advance in chucks suitable for use in coupling a power driven shaft to such tools, especially router bits. Such a chuck (illustrated in FIG. 1 (PRIOR ART)) comprised a chuck body 11, provided with an aperture 114 into which a collet 115 can be inserted.

The other end of aperture 114 was provided with means, such as internal threads 120 (FIG. 2 (PRIOR ART)) for attachment to an electrically, pneumatically, hydraulically or other driven shaft. A collet 115 is insertable into aperture 114 and the shank 100 of cutting element 101 were secured in aperture 114 through the provision of a clamping mechanism extending through a bore 116 extending through aperture 114. The clamping mechanism comprised two clamping elements 108, 109 pulled together by means of a screw 110. At least clamping element 108 was threaded 90 to accept the threads 94 of screw 110 such that upon tightening the threads, screw head 96 clamped elements 108, 109 about collet 115 (or alternatively directly on the shaft 100 of cutting element 101) to securely couple the cutting element 101 and the power driven shaft of the power tool.

Although a great advance over the prior art chucks, the Walsh invention had several drawbacks.

The provision of bore 116 to accommodate two clamping elements extending through aperture 114 made the size of the chuck body relatively large and bulky to accommodate the clamping elements. Still further, clamp elements 108, 109 had to have alignment elements, such as keys and keyways 108', 109' to retain them in a desired orientation with regard to collet 115, or shank 100, of cutting element 101.

The large size of the chuck exacerbated balancing as such chucks were used in routers known to revolve at speeds above 20,000 rpm (revolutions per minute).

Runout of the cutting element 101 became a problem as it was impossible to use threads 120 to simultaneously couple the chuck body 112 to the power driven shaft (not shown) while attempting to also align the respective centerline of the shank 100 and power driven shaft (not shown).

Another attempt at providing a chuck for a cutting tool is found in U.S. Pat. No. 5,348,319. In the device of that patent, a cam was provided which was pivotably mounted and activated by a set screw. However, the lever end of the cam, in conjunction with the set screw, could not generate sufficiently high holding power to withstand the forces tending to dislodge a cutting tool, especially a cutting tool rotating at high speed, such as in a router. To increase the length of the lever end of the cam would require enlarging the size of the chuck to accommodate the increased length, further tending to create a large and bulky mass, which, when subjected to high rotational speeds, would introduce additional problems which negates the proposed utility of the device as a chuck.

None of the attempts known to the inventor have been able to improve the requirements of a chuck for holding cutting, boring or other tools, and, especially, no one skilled in the art has provided an easy to use router chuck having acceptable torque for holding a cutting element without slippage while permitting ease of construction of the chuck.

SUMMARY OF THE INVENTION

It is an object of the present invention to improve the Walsh chuck to reduce the large and bulky nature of the chuck body while retaining the excellent collet (or shank) holding properties thereof.

It is a further object of the invention to provide a new manner in which the chuck body of the invention can be secured to a driven shaft of a power tool in which alignment of the centerlines of the drive shaft and cutting element remain in alignment while simultaneously providing secure retention of the chuck body to the drive shaft.

It is a still further object of the invention to provide a collet or shank clamping element positioned at or nearly tangentially to a collet or shank receiving bore in the chuck body which does not require keys (or keyways) to align the clamping element relative to the collet or shaft to be clamped.

It is another object of the invention to provide a chuck of such weight, size and bulk as not to exacerbate balancing even when rotating at speeds in excess of 20,000 rpm.

It is a still further object to provide a method of aligning and coupling two elements, e.g., shafts, a chuck and a shaft, and other similar elements by the use of an novel centering and retaining element.

These and other objects of the invention will be apparent when read in light of the accompanying description of the preferred embodiments and appended drawings.

DESCRIPTION OF THE PREFERRED EMBODIMENT

Figure 1:
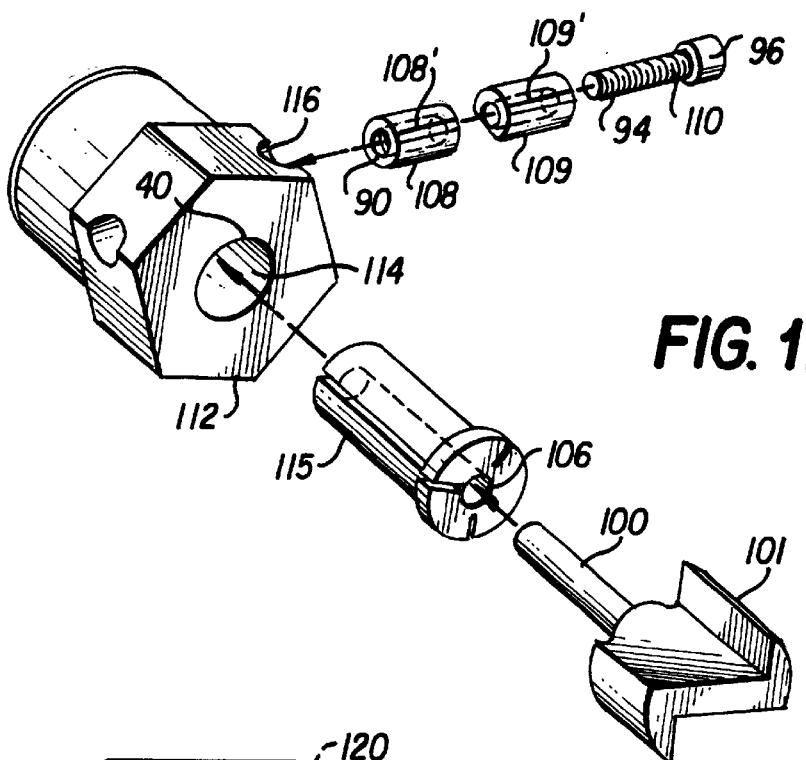
FIG. 1 (PRIOR ART) is a schematic exploded view of the invention of Joseph P. Walsh as described in U.S. Pat. No. 5,096,212.
Figure 2:
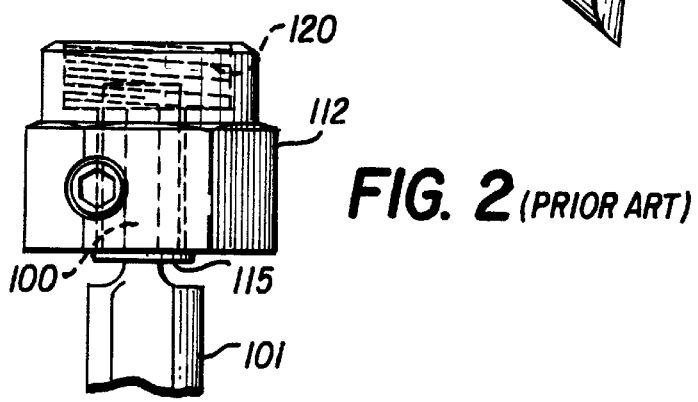
FIG. 2 (PRIOR ART) is a side view of a partially assembled chuck and conventional router bit with the collet of FIG. 1.
Figure 3:
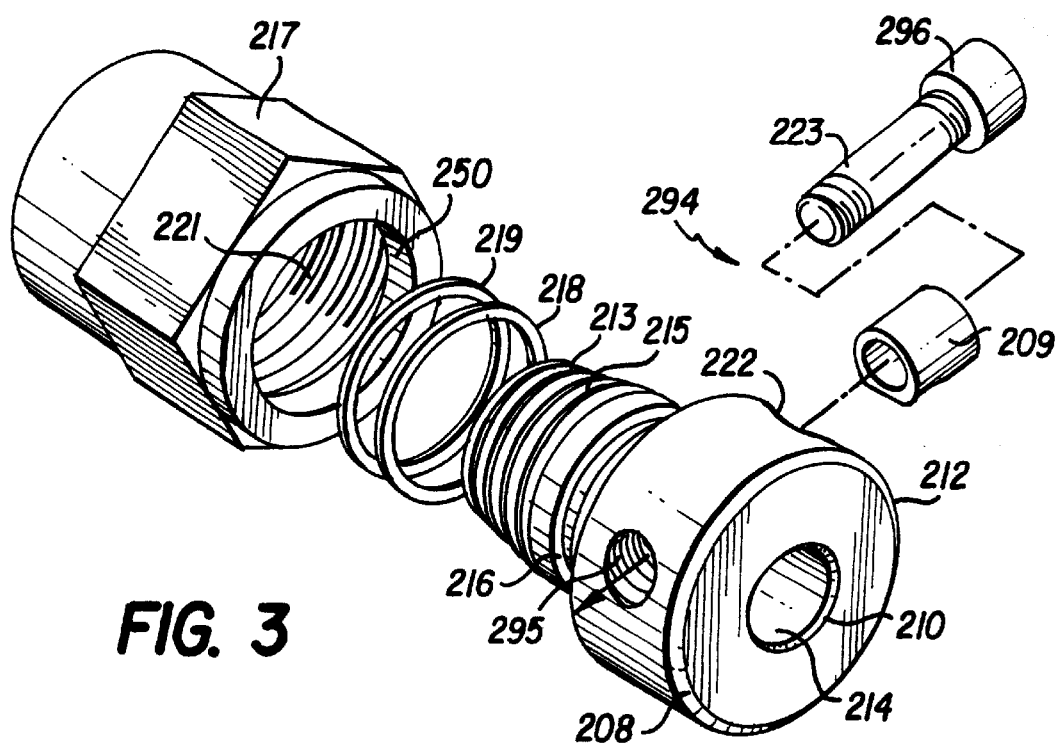
FIG. 3 is an exploded, schematic view of the chuck of the present invention.

In FIG. 3 is shown a chuck body 212 with an aperture 214 therein to accept a collet or shank of a cutting tool (not shown but similar to collet 115 and shank 100 of FIG. 1). Chuck body 212 defining the entrance of aperture 214 is optionally milled or chamfered at 210. For aesthetics, the outer periphery of chuck body 212 may also be optionally chamfered or surface ground as at 208.

The rear of chuck body 212 is provided with a cone-shaped extension 213 of chuck body 212 having an helical groove 215 therein. As the helical groove descends the cone-shaped extension 213 toward chuck body 212, it intersects a circumferentially extending groove 216.

A collet nut 217 is captured by a single, or a series, of coiled spring washers (or spiral locks) 218, 219, etc. (a single, or series, of spiral locks, one to five being preferred), two being most preferred, which are threaded down the helical groove 215 until they are seated within groove 216 and restraining flange 250 thereby preventing relative axial movement of the collet nut 217 and chuck body 212. Collet nut 217 is thus free to rotate about the cone shaped extension 213 but is prevented from axial movement related thereto by the series of coiled spring washers, 218, 219 etc. within groove 216.

The cone-shaped extension has a shape such that at least a part of its outer surface is complimentary to a recess bored into the end of an element to which it is to be connected, e.g., to a shaft as a power driven shaft (not shown) of the power tool (not shown). The cone-shaped extension 213 and recess bored into the power drive shaft align the respective centerlines of aperture 214 and power driven shaft both axially and radially.

The collet nut 217 retains chuck body 212 to the power driven shaft by means of threads 221 on the interior of collect nut 217, which mate with external threads on the power driven shaft but acts only as a securing means and does not act in aligning the chuck body aperture 214 to the power driven shaft. As an alternative to threads, other fastening means, such as a bayonet coupling, may be used.

Figure 5:
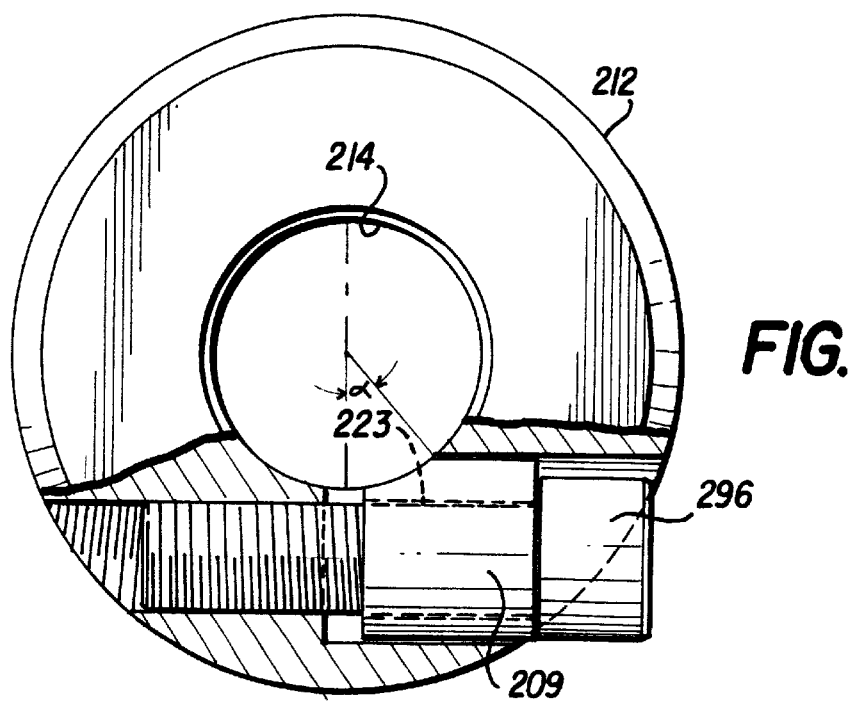
FIG. 5 is an enlarged front view of the chuck body of the invention.

As shown in FIG. 3, chuck body 212 is also provided with an aperture 222 tangential thereto to accept a clamping element 209. Clamping element 209 is unthreaded and is bored through off center such that it does not rotate within aperture 222 upon tightening of a screw 294 with threads 223. Although aperture 222 to receive clamping element 209 intersects aperture 214, such intersection to aperture 214 does not extend for its full cross-section completely across aperture 214 as in the Walsh chuck. Rather, as shown in greater detail in FIG. 5, clamping element 209 defines an angle of intersection with the aperture 214 which clamping element intersects the circumference of the aperture 214 and contacts (when inserted into aperture 214) the outer periphery of a cutting tool shaft, the exterior of a collet placed within aperture 214, etc. The angle may vary but is measured along a diameter of aperture 214 normal to the longitudinal axis of screw 294. The area of contact defined by angle by clamping element 209 determines the degree of clamping force. I have found that clamping from about tangent to not more than 45°, preferably about 40°, provides the greatest holding power upon the shaft of a bit or upon the exterior of a collet placed within aperture 214. In a particularly preferred embodiment, as shown in FIG. 5, the clamping element can be displaced a few degrees shy of tangent and still develop substantial torque upon the element placed within aperture 214. The remainder of the aperture is of smaller cross section and is suitable internally threaded to receive the threads of a screw 294.

The single clamping element 209 is of generally cylindrical configuration but could have other external configurations as desired. The generally cylindrical configuration is most preferred however insofar as it is easiest to form a circular cross-sectioned aperture 222 in chuck body 212 as opposed to an aperture of any other non-circular cross-sectional shape.

Clamping element 209 has an offset unthreaded bore therein which permits a threaded screw or other fastening element to pass therethough. The headed end 296 of screw 294 forces clamping element 209 into aperture 222 to engage with a collet (similar to collet 115 of FIG. 1) or shank of a cutting tool (similar to shank 100 of cutting element 101 of FIG. 1) to secure the same within aperture 214. Clamping element 209 is suitably shaped such that the end distal from the end adjacent the headed end 296 of screw 294 is milled to conform the distal end with the collet or shank of the cutting tool so as to exert the greatest clamping force on an inserted collet or shank of a cutting tool (not shown) inserted into aperture 214. Such milling can also include a chamfering of said distal end to facilitate insertion of the collet or shank. Upon rotation of screw 294 engaging threads 295 thereby forcing clamping element 209 into aperture 214, the milled end of clamping element places a large force on either collet or shank of cutting tool inserted into aperture 214 to secure the same within the aperture. Both axial and tangential forces on the cutting tool will be resisted by means of the structural interrelationship of elements constituting the clamping mechanism.

Headed end 296 is shaped so as to receive any conventional tool (not shown) such as a hex socket to receive a T-handle Allen wrench (not shown) to rotate the screw to impart, or relieve, the clamping force. Because the clamping element 209 is at or nearly tangential to aperture 214, a great mechanical advantage is achieved and the size of the clamping element necessary to achieve the same clamping effect as in the Walsh chuck can be reduced. Such reduction in size permits an overall reduction in the size (and hence weight and bulk) of the chuck body 212.

The chuck body 212 (and related elements) may be made of the same or similar materials as the Walsh chuck, for example, a carbon steel (e.g., a low, medium, or a high carbon steel) or other metal such as tool steels, alloy steels, stainless steels, etc.

They may be finished by various surface treatments known to the art such as oxiding to darken or lighten the color of its exterior surfaces, thermally treated to alter its hardness and other treatments generally known to those in the machine tool art.

It is to be understood that although I have discussed the use of a collet to receive the shank of a cutting tool, it will be understood by those skilled in the art that a series of collets can be used with the chuck to accept various shanks of different sizes. It will also be understood that the shank of a cutting tool approximately the size of aperture 214 may be inserted directly into the aperture 214 without a collet, the collet(s) being used to adapt smaller sized shanks to the aperture 214.

In another embodiment of the invention, I have provided a method whereby elements, such as shafts, a chuck and a shaft, etc. can be aligned and coupled with great mechanical precision.

Figure 4:
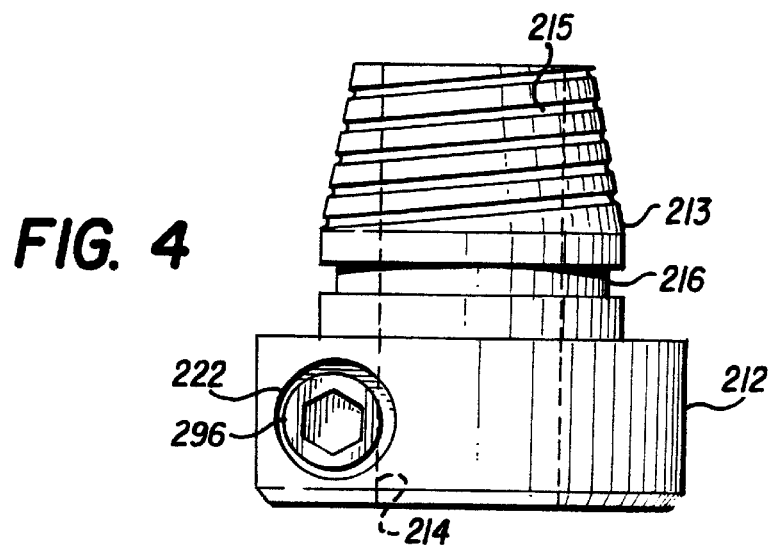
FIG. 4 is a side view of the chuck of the present invention.

In such a method, an end of a shaft (not shown) may be milled into a cone shape having a groove at the base of the cone similar to the shapes 213 and 216 of FIG. 4, respectively. A spiral groove, similar to groove 215 of FIG. 4 can be provided on the surface of the cone shape. A nut or other fastener similar to nut 217 (FIG. 3) having internal threads is then placed over the cone and surrounding the groove at the base of the cone. A series of spiral locks (preferable at least two) are manipulated over the spiral groove so as to lock the nut or other fastener to the shaft to prevent longitudinal separation of the same.

A shaft, chuck or other element may be interiorly milled with a shape corresponding, at least in part, to the cone shape so as to receive the same. The exterior surface of the shaft, chuck, etc. can be provided with threads matching the interior threads of the nut or other fastener and, upon engaging the respective threads, the cone will be drawn into and aligned with the complimentary surface of the shaft, chuck, etc. and further tightening will couple the elements. This method has been found to satisfactorily align the centerlines of the elements consistently to within tolerances of a few thousands of an inch.

Having described my invention, it will be apparent to those of ordinary skill in the art that modifications may be made thereto without departing from the spirit or scope of the invention.

I claim:

1. A chuck, said chuck comprising a chuck body;

said chuck body defining, along its longitudinal centerline, a first aperture sized to receive the shaft of a tool or a collet for said tool;

a second aperture intersecting said first aperture;

a single clamping element in said second aperture; said clamping element defining an angle of intersection with said shaft or collet; said angle being from about tangent to not more than 45°;

said clamping element being relatively moveable within said second aperture from a position in engagement with a shank or collet placed in said first aperture to a position not in engagement with said shank or collet.

2. The chuck of claim 1, wherein the clamping element is retainable in engagement with said shank or collet by means of a fastener passing through a bore in said clamping element.

3. The chuck of claim 2, wherein the fastener is a threaded element.

4. The chuck of claim 2, wherein a longitudinal axis of said bore in said clamping element is off center of a longitudinal axis of said clamping element.

5. The chuck of claim 1, when said angle is about 40°.

6. A chuck, said chuck comprising a chuck body;

said chuck body defining, along its longitudinal centerline, a first aperture sized to receive the shaft of a tool or a collet for said tool;

a second aperture intersecting said first aperture;

a single clamping element in said second aperture;

said clamping element being relatively moveable within said second aperture from a position in engagement with a shank or collet placed in said first aperture to a position not in engagement with said shank or collet;

said chuck body further comprising a cone shape concentric with the longitudinal centerline of said chuck body, said cone shape having on its surface a spiral groove.

7. The chuck of claim 6, wherein said cone shape terminates at its base with a groove.

8. The chuck of claim 7, further comprising a nut surrounding said groove and a series of coiled spring washers in said groove to thereby prevent relative longitudinal separation of said nut and chuck body.

9. The chuck of claim 7, wherein said nut has internal threads.

10. A method of coupling two elements, said method comprising providing two elements;

on one of said elements forming a cone shape terminating in a groove at the base of said cone;

placing a nut about said groove;

filling said groove with a series of coiled spring washers;

forming an internal aperture on said other element, said internal aperture having a shape corresponding at least in part to said cone shape, inserting said cone shape within said internal aperture;

securing the two elements together with said nut.

11. The method of claim 10, wherein said cone shape is provided with a spiral groove on its outer surface terminating in said groove at the base of said cone and said method further comprises threading said series of coiled spring washers along said spiral groove.

12. The method of claim 10, wherein one of the elements comprises a chuck and the other element comprises a shaft.

13. The method of claim 12, wherein the cone shape is on said chuck.

14. A router chuck comprising a chuck body; said chuck body defining a longitudinal aperture to receive a cutting tool or a collet for said cutting tool; a single clamping element received in a second aperture intersecting said first aperture; said single clamping element designed to contact said cutting tool or collet at or near a tangent to an angle not greater than 45° from tangent.

15. The router chuck of claim 14, wherein said clamping element defines an unthreaded bore, a longitudinal axis of said bore being offset from a longitudinal axis of said clamping element.

16. The router chuck of claim 15, further comprising a threaded screw within said bore.

17. The router chuck of claim 14, further comprising means for attaching said chuck to the shaft of a power tool.

18. The router chuck of claim 17, wherein said means comprise a nut which is captured on said chuck body.

19. The router chuck of claim 18, wherein said means comprise a cone shape on said chuck body, a nut captured on said chuck body by a series of coiled spring washers received within a groove at the base of said cone shape.

* * * * *